Patented Sept. 1, 1953

2,650,907

UNITED STATES PATENT OFFICE 2,650,907

STYRENE-COPOLYMER AND METHOD OF PRODUCING THE SAME

James H. Sample, Chicago, Ill., assignor to The Sherwin-Williams Company, Cleveland, Ohio, a corporation of Ohio No Drawing. Application August 18, 1950, Serial No. 180,321

34 Claims. (Cl. 260—23)

This invention relates as indicated to synthetic drying resins, and more particularly to improved co-polymers of aromatic vinyl compounds and partially polymerized drying or semi-drying oils. This invention also relates to a novel method for producing the indicated resins.

It has been known for some time to treat with vinyl aromatics, drying oils, drying oil acids, alkyds, partially polymerized or blown oils, etc. to produce improved varnishes. A variety of conditions and catalysts are known for this reaction, including, for example, peroxides, sulphur, sulphur dioxide, etc. Many problems have, however, been encountered with some of the so-called styrenated vehicles. Among these problems are relatively slow drying time, poor dry film resistance to mineral spirits such as gasoline, lack of clarity, etc. to mention but a few.

It is a principal object of this invention to provide means by which improvements in the co-polymer are achieved in respect to drying time and mineral spirit resistance in particular, and in clarity of the final product.

It is also a principal object of this invention to provide a co-polymer of a vinyl aromatic compound and a blown oil which will become tack-free in a relatively short period of time and which resists the solvent action of mineral spirits, such as gasoline, applied to the dry film in an improved manner over that obtained from resins produced by other processes using the same reactants.

Another object of this invention is to provide a method for producing these improved synthetic drying resins.

Other objects will appear as the description proceeds.

To the accomplishment of the foregoing and related ends, said invention, then, consists of the means hereinafter fully described and particularly pointed out in the appended claims, the following description setting forth in detail certain embodiments of the invention, such disclosed means constituting, however, but a few of the various forms in which the principle of this invention may be employed.

Broadly stated, this invention comprises the provision of a fast drying, mineral spirit or gasoline resistant co-polymer produced by co-polymerizing a vinyl aromatic compound and a partially polymerized non-conjugated drying oil or semi-drying oil at a temperature of from about 225° F. to about 500° F. in the presence of from about 0.02% to about 0.1% by weight of the oil of a heavy metal drier, and from 0.5% to about 2.0% by weight of the oil of a metal-free peroxide, and cooking until a proper curing time is reached. More specifically, blown oils of the non-conjugated drying and semi-drying types, e. g. linseed oil, soy bean oil, safflower oil, sunflower oil, chia, perilla oil, menhaden, sardine, etc. and mixtures of various oils, e. g. mixtures of blown oils and mixtures of blown oils with conjugated drying oils (e. g. dehydrated castor oil), when co-polymerized with a vinyl aromatic compound such as styrene, divinyl benzene, or the like, in the presence of both the drier, such as would ultimately be incorporated in the vehicle, and a metal-free peroxide such as hydrogen peroxide, cumene hydroperoxide, benzoyl peroxide, di-t-butyl peroxide, etc. In certain cases it is desirable to use an inert solvent, e. g. xylene and/or mineral spirits, although it is not always necessary.

By "inert solvent" is meant that the solvent, usually hydrocarbon, is not acted upon by the reagents or products to any substantial degree in the course of the reaction, nor does the solvent act upon the reagents or products. Benzene, xylene, toluene, mineral spirits, hexane, heptane, etc. may be used as inert solvents per se or in admixture with another inert solvent.

The oils useful in accordance with this invention and broadly indicated above are, for the most part, vegetable oils of the drying and semi-drying types. However, synthetic drying oils of the glyceride type produced by esterification of glycerol, or other polyhydric alcohol, e. g. pentaerythritol, sorbital, mannitol, etc. with pure unsaturated higher fatty acids, e. g. oleic, linoleic, etc. or crude acids derived from drying and semi-drying oils may be used, although in certain cases the commercal practicability of such esters is less.

In general, the starting oils for use in this invention are "blown oils," that is, the oil has been blown with air or other free oxygen-containing gas until a desired body is obtained. The term "partially polymerized" is used herein to mean oils which have been blown with a free oxygen-containing gas. Blowing generally increases the viscosity of the oil, probably due to combined effects of polymerization and oxidation. Heat bodied oils may also be used. Partially polymerized oils have a wide variety of properties depending upon the time over which blowing is continued, the temperature, the exposed reactive surface area, etc. Generally, those blown oils having a mineral spirit reduction minimum of about 800% and a maximum of 2200% to 2500% may be used as the starting materials in this invention. Alternatively, the viscosity of the blown oil may be used as a criterion for selecting the oil. For most purposes, the viscosity of the blown oil may range from about E to $Z_6$. Blown soy bean oils having a viscosity of Z to $Z_4$ are preferred, and blown linseed oils having a viscosity of E to $Z_3$ are also preferred. Best results are obtained with blown linseed oils and blown fish oils e. g., menhaden and sardine oils having viscosities near W. Generally, the pentaerythritol esters of soya fatty acids, linseed fatty acids and safflower fatty acids, for example, after blowing will have viscosities at the upper end of the range, e. g., $Z-Z_6$.

Reference has been had to vinyl aromatics in general as being suitable for use in this invention, styrene being a principal and preferred material. Although pure styrene may be used, the commercial styrenes containing substances to stabilize them against polymerization at ordinary temperatures have been found to be satisfactory. Thus, styrene containing a stabilizer, such as p-tertiary butyl catechol, which becomes decreasingly effective as the temperature increases above 300° F., gives good results.

Broadly, the preferred vinyl aromatic compounds may be identified as monovinyl aromatic compounds, or styryl compounds, which latter class is characterized by the presence of a phenyl radical in combination with a vinyl group. Various substituent groups may be present on the phenyl radical, for example, halogen, e. g., chlorine and fluorine, alkoxy radicals, e. g., methoxy, hydroxy, alkyl radicals, e. g., methyl and halogen substituted alkyl radicals, e. g., mono-, di-, or trichloromethyl or mono-, di-, or trifluoromethyl. Other suitable vinyl aromatics useful for the purposes of this invention include meta and para trichloromethyl styrene, meta and para trifluoromethyl styrenes, methoxy styrenes, vinyl naphthalene and the like. Alkyl substituents may also be present on the vinyl group, as in alpha methyl styrene, but it is clear that such substituents should not be of the type as will inhibit or unduly retard the co-polymerization reaction. Styrene is a preferred material because of its availability, relatively low cost, and convenience.

The styrene may also be replaced in whole or in part with alpha methyl styrene, para chlorostyrene, para fluorostyrene, alpha chlorostyrene, alpha fluorostyrene, meta chlorostyrene, para methyl styrene, meta methyl styrene, ortho methyl styrene and/or dichloro, difluoro or dimethyl styrene derivatives. In general, these compounds are characterized by a single benzene nucleus to which is added an acyclic unsaturated hydrocarbon chain, or, more specifically, a vinyl group. Compounds of this preferred class are referred to herein as "styryl" compounds.

The styryl compounds can also be replaced in whole or in part by other olefinic compounds, particularly the aliphatic mono-olefinic hydrocarbons of relatively low molecular weight, e. g., having less than six carbon atoms. Various oxygen-containing unsaturated aliphatic materials may also be used in this process, such as, for example, vinyl acetate, vinyl butyrate, vinyl ethers such as vinyl ethyl ether, vinyl propyl ether, and esters of unsaturated acids such as methyl and ethyl acrylates. Examples of unsaturated aliphatic hydrocarbons which may be used in this process include ethylene, acetylene, propylene, isobutylene, etc. The allyl alcohol esters of saturated, low molecular weight fatty acids such as allyl acetate may also be used.

Dipentene and/or pinene have been used to replace some of the solvent in these reactions, and it is believed that these unsaturates enter into reaction along with the styrene or styryl compound. D-limonene may also be used in place of some of the solvent, or, as other unsaturated terpene hydrocarbons, to replace part or all of the styryl compound.

The driers used in accordance with this invention are the heavy metal soaps or salts of relatively high molecular weight organic acids characterized by solubility in drying oils.

The metallic radicals are the most important component of the soaps or salts which are included in the generic term "drier" and include lead, zinc, cobalt, manganese, iron, copper, nickel, etc.

The acidic radicals, which afford solubility of the metal in the compositions in which driers are included, are exemplified by organic acids containing from 6 to 24 carbon atoms in the molecule. Acids of this class are the seed oil fatty acids, fish oil fatty acids, naphthenic acids, rosin acids and octoic acids. Seed oil fatty acids include principally oleic, linoleic, linolineic, rincinoleic, etc. Fish oils include acids having as high as 24 carbon atoms in the molecule. Napthenic acid factions useful include $C_nH_{2n}O_2$, where $n$ is 6–7; $C_nH_{2n-2}O$, where $n$ is 8–12 and $C_nH_{2n-4}O_2$, where $n$ is 12 to 23. Rosin acids may be hydrogenated rosin, disproportionated rosin, etc. The most useful octoic acid is the 2-ethyl hexoic acid. Specific examples of driers include:

Lead naphthenate.
Zinc lead naphthenate.
Lead linoleate.
Cobalt linoleate.
Cobalt naphthenate.
Manganese naphthenate.
Iron naphthenate.
Iron resinate.
Lead octoate.
Cobalt octoate.
Manganese octoate.
Basic lead naphthenate.
Basic zinc naphthenate.
Lead resinate.
Cobalt resinate.
Manganese linoleate.
Manganese resinate.
Iron linoleate.
Copper naphthenate.
Lead "oilsolates." *
Cobalt "oilsolates." *
Manganese "oilsolates." *

* Oil-soluble salts of the condensation product of capryl alcohol and monochlor acetic acid in the presence of a base.

More than one drier may be used, if desired, and a particular combination of driers which is frequently used is one of the foregoing soaps together with a corresponding calcium soap. Other mixtures include cobalt-lead and manganese-lead soap mixtures. The nature of the organic residue has little or no influence on the reaction.

For production of vehicles having drying properties, the cobalt, manganese, iron and nickel soaps are preferred.

In producing the vehicles in accordance with this invention, the quantity of heavy metal drier ordinarily used may vary from about .02% to about .1% by weight of the oil, although satisfactory results have been obtained with larger amounts up to 1% by weight of the oil. For most purposes, .05–0.075% by weight of the oil of heavy metal drier will be found to be satisfactory for use in accordance with this invention. Since the driers are usually oil-soluble in the percentages employed, it is convenient to utilize the driers as an oil solution in this invention.

The second essential component in the process of this invention has been broadly identified as a metal-free peroxide. In general, any relatively low molecular weight metal-free peroxide may be used in this invention. Specific examples of peroxides have been mentioned above and include hydrogen peroxide, ozone, aromatic peroxides, such as cumene hydroperoxide and benzoyl peroxide, and aliphatic peroxides, such as di-tertiary butyl peroxide, and the like. Generally, the peroxides are introduced into the co-polymerization reaction in relatively minor amounts ranging from about 0.5% to about 2% by weight of the oil.

The peroxide may be added in aliquot portions periodically during the course of the reaction, or may be introduced continuously, preferably in dropwise fashion, or periodically in dropwise fashion in the course of the co-polymerization reaction.

It becomes convenient to illustrate this invention with several examples and comparing the results obtained when the coacting drier and peroxide are used individually with the results obtained when they are used in combination. The following examples are for illustrative purposes only and are not to be construed as limiting the invention to the scope thereof.

*Example I*

800 grams of blown linseed oil having a 1600% mineral spirit reduction, 800 grams of styrene, and 800 grams of mineral spirits were mixed and heated to a temperature of about 300° F. Every 30 minutes thereafter, 20 drops of 30% hydrogen peroxide were added until 30 grams of the hydrogen peroxide had been introduced. After 12 hours and 15 minutes, the vehicle cured at 20 seconds, and was thinned with 520 grams of xylol and an additional 300 grams of mineral spirits. The product was then filtered.

The yield of product obtained was 1500 grams of a material having the following properties:

NVM _____ 48.1%
Viscosity _____ J
Color _____ 13
Acid value _____ 4.6
Final cure _____ 20 seconds When 0.5% lead and 0.05% cobalt metal (based on varnish solids) were added and 3 mil. films drawn, this material dried as follows:

Set _____ 35 minutes
Kraft _____ 45 minutes
Foil _____ 1 hr. 45 minutes

The overnight examination of the film revealed a hard, tough material. This film would withstand only 20 to 30 rubs of VM & P naphtha, using a soaked rag and passing across the film using finger pressure.

*Example II*

Following the same procedure as given in Example I, with the exception that 0.02% cobalt naphthenate (based on solids) was used in place of the peroxide, and conducting the reaction for 24 hours at 125–150° C., a comparable vehicle to that produced in Example I was obtained with the exception that the material dried much more slowly, requiring almost 8 hours to become foil free with corresponding lags for set and Kraft times.

*Example III*

3600 grams of blown linseed oil, 3600 grams of styrene, 1710 grams of mineral spirits, 1800 grams of xylol, and 90 grams of cobalt naphthenate solution (2%) are mixed and heated to a temperature of 300° F. At this point, 60 drops of 30% hydrogen peroxide are added every 30 minutes until 120 grams have been added. The heat period is continued for a period of approximately 13 hours after which time the product is thinned to a J to L viscosity (at 50% NVM) with 1650 grams of xylol and 1800 grams of mineral spirits.

The base yield in this case was 6900 grams of a material having the following properties:

NVM _____ 50%
Viscosity _____ K
Color _____ 10
Acid value _____ 8

The drying times for this vehicle using driers as given in Example I above are as follows:

Set _____ 30 minutes
Kraft _____ 2 hours
Foil _____ 3 hours

This film is not affected by 120 rubs of VM & P naphtha except for a slight softening. Recovery is very quick.

*Example IV*

Following exactly the same procedure as in Example III, by using a blown fish oil having a viscosity of W, the following properties were observed.

Viscosity _____ H to I
Color _____ 18
Acid value _____ 5.3

The drying times for this vehicle are as follows:

Set _____ 20 minutes
Kraft _____ 1 hour
Foil _____ 4 hours

This film is not affected by 50 rubs of VM & P naphtha.

*Example V*

Following the same procedure given in Example III, a mixture of ½ blown linseed oil and ½ blown fish oil was used in place of the blown linseed oil of Example III. The characteristics, the drying rate, and the mineral spirit resistance obtained in this case were for all practical purposes identical to those obtained in Example III.

*Example VI*

800 grams of blown soya bean oil having a viscosity of Z, 800 grams of styrene, 600 grams of mineral spirits, and 200 grams of dipentene were mixed and heated to 300° F. 30 grams of 30% hydrogen peroxide were added at the rate of 20 drops every 30 minutes. A 20 second cure was obtained at the end of 15 hours, and the material was thinned with 500 grams of xylol and 300 grams of mineral spirits. The base yield in this case was 1500 grams and the product had the following properties:

NVM _____ 50%
Viscosity _____ G to H
Color _____ 9
Acid value _____ 5

This material had the following drying characteristics:

Set _____ 35 minutes
Kraft _____ 2 hours
Foil _____ 5.5 hours

The film produced from this product withstood less than 20 rubs of VM & P naphtha.

*Example VII*

800 grams of blown soya bean oil as used in the previous example, 800 grams of styrene and 2 grams of 6% cobalt naphthenate were mixed and heated for a period of 7 to 8 hours at 250–320° F. followed by vacuum stripping. The unreacted styrene was stripped out using 30 to 70 mm. Hg. When cut to 50% solids in 700 grams of mineral spirits and 100 grams of dipentene, the product had the following properties:

Viscosity _____ I
Color _____ 10
Acid value _____ 5.6

The drying times determined in the usual manner were as follows:

Set _____ 30 minutes
Kraft _____ 24 hours
Foil _____ over 24 hours

This film withstood 40 rubs of VM & P naphtha before evidence of film failure.

*Example VIII*

Following the same procedure as given in Example VII with the exception of the addition of 30 drops of hydrogen peroxide every 30 minutes, this material when cut 50% with half xylol and ½ mineral spirits had the following properties:

Viscosity _____ K
Color _____ 9
Acid value _____ 6.2

The drying schedule for this product was as follows:

Set _____ 30 minutes
Kraft _____ 2 hours
Foil _____ 5¾ hours

This film withstood more than 40 rubs of VM & P naphtha.

*Example IX*

Following the same procedure as given in Example I above, 960 parts of air blown linseed oil, 640 parts of styrene, and 520 parts of xylene were combined and resulted in a product having the following properties:

NVM _____ 49%
Viscosity _____ F
Color _____ 9
Acid value _____ 2
Final cure _____ 10 seconds When the driers containing 0.5% lead and 0.05% cobalt as the metals (based on varnish solids) were added and 3 mil. films drawn, this material had the following drying characteristics:

Set _____ 24 minutes
Kraft _____ 1 hour, 56 minutes
Foil _____ greater than 8 hours After 40 hours drying time, the film withstood 240 rubs in the previously described solvent resistance test.

*Example X*

Example IX was repeated with the addition of 12 parts of 6% cobalt naphthenate solution prior to the styrenation reaction. The resultant product had the following properties:

NVM _____ 42.5%
Viscosity _____ C
Color _____ 11–12
Acid value _____ 2.1
Final cure _____ 9 seconds When driers were added as in Example IX, the film had the following drying characteristics:

Set _____ 8 minutes
Kraft _____ 58 minutes
Foil _____ 8 hours, 18 minutes

After 40 hours drying time, this film withstood 330 rubs in the previously described solvent resistance test.

*Example XI*

Following the same procedure as given in Example IX above with the exception that 25 parts of ditertiary butyl peroxide were substituted in lieu of the hydrogen peroxide, a product was obtained having the following physical properties:

NVM _____ 49.5%
Viscosity _____ F
Color _____ 9–10
Acid value _____ 2
Final cure _____ 9 seconds A film produced as in Example IX had the following drying characteristics:

Set _____ 22 minutes
Kraft _____ 2 hours, 10 minutes
Foil _____ more than 8 hours After 40 hours drying time, this film withstood 180 rubs in the solvent resistance test.

*Example XII*

Following the same procedure as given in Example XI, with the exception that 12 parts of 6% cobalt naphthenate solution were added, a product having the following characteristics was obtained:

NVM _____ 42.5%
Viscosity _____ C
Color _____ 11–12
Acid value _____ 2.1
Final cure _____ 9 seconds When driers were added as in Example I, the material dried as follows:

Set _____ 12 minutes
Kraft _____ 1 hour, 2 minutes
Foil _____ 8 hours, 22 minutes After 40 hours drying time, the film resulting from the varnish had a solvent resistance of 320 rubs.

Example XIII

Following the same procedure as given in Example I, 1190 parts of air blown linseed oil, 410 parts of styrene, and 30 parts of hydrogen peroxide were reacted. In this case the ratio of oil to styrene is appproximately 75:25. The resultant product had the following properties:

| | |
|---|---|
| NVM | 50.5% |
| Viscosity | E plus |
| Color | 9–10 |
| Acid value | 2.2 |
| Final cure | 9 seconds |

Driers were added as in Example I and the film had the following drying characteristics:

| | |
|---|---|
| Set | 28 minutes |
| Kraft | 3 hours, 48 minutes |
| Foil | greater than 24 hours |

After 40 hours drying time, the above film withstood 120 rubs in the previously described solvent resistance test.

Example XIV

Using the same materials and quantities as given in Example XIII, with the addition of 8 parts of 6% cobalt naphthenate prior to styrenation, a product was obtained according to the procedure of Example I having the following properties:

| | |
|---|---|
| NVM | 49% |
| Viscosity | E |
| Color | 11 |
| Acid value | 2.8 |
| Final cure | 10 seconds |

Driers were added as in previous examples and after 40 hours drying time, this film withstood 180 rubs in the previously described solvent resistance test.

From the foregoing examples, it will be observed that unusually improved mineral spirit resistance has been obtained in the procedure of this invention. Except in cases where the drying time is extremely rapid as in Example I, the drying times are generally improved over those drying times obtained when the individual catalysts are used in the absence of the other. For the most part the drying times obtained from vehicles produced solely in the presence of the drier are unusually high, and the colors are generally darker. These results together with other tests that have been conducted clearly demonstrate that the use of a metal-free peroxide with a drier during the varnish cook yields a material which dries rapidly, has improved solvent resistance, and somewhat improved color.

In general, the reaction temperature is preferably from about 225° F. to about 350° F., although much higher temperatures up to about 500° F. may be employed if desired. I prefer to employ temperatures of about 300° F., i. e., 275° F. to 325° F. The time of reaction has been found to be variable between about 8 hours and 18 hours, dependent upon the size of the batch, the temperature and other conditions prevailing, but the reactions are for the most part carried out for from 11 to 15 hours at about 300° F. The cure time is generally not less than about 9, and more desirably from 10 to about 20 seconds.

With respect to the proportion of the vinyl aromatic compound as related to the oil component, this may range from limited excesses of vinyl compound e. g., 60% vinyl aromatic to 40% oil, to an excess of oil in the final product. Generally, a 50–50 product is produced by the procedures indicated above, although a ratio of as much as 75 parts of oil to 25 parts of vinyl aromatic may be employed for certain purposes. Ratios of 70–30 and 60–40, the oil proportion being first indicated, have been produced in accordance herewith.

Additional tests have also indicated that cumene hydroperoxide, benzoyl peroxide, and ditertiary butyl peroxide are equally efficient in this process. Other aromatic, aryl, aliphatic, alkyl, or mixed alkyl-aromatic peroxides can be used, of course, with varying degrees of efficiency. Ease of handling, cost and storage requirements determine in a large measure which peroxide is to be used as the preferred material. Hydrogen peroxide as a 30% solution, and cumene hydroperoxide, are to be preferred for these reasons.

Note should also be made of the fact that Examples VII and VIII were conducted in the substantial absence of a solvent. Thus, this invention does not require the use of solvents in every instance. In some cases, large excesses of the vinyl aromatic compound may be employed to serve as a solvent. Such excesses may be recovered by well known means at the conclusion of the reaction.

Another test to demonstrate gasoline resistance was performed on the vehicles of this invention substantially as follows. The films were allowed to dry for 72 hours and then submerged in gasoline. A soya vehicle made without any drier but with peroxide failed this test in 1 hour, whereas a film prepared from a soya vehicle in the presence of the drier and the peroxide withstood this solvent for a period of 48 hours. Similar results are obtained with the other examples of this invention.

Enamels have been made from the compositions of this invention in the ordinary manner. Generally, these enamels are tack-free in considerably less than 2 hours and can be readily re-coated after standing overnight. The gloss, elasticity, and adhesion were excellent in each case.

As indicated above, coating compositions are readily prepared from the vehicles of this invention following standard formulation procedures and utilizing the ordinary driers, pigments, and resins usually employed in varnishes and baking enamels in the usual amounts. Among the pigments and fillers which may be used with said coating compositions may be mentioned titanium dioxide, zinc oxide, iron blue, and the like. Other resins may be employed in combination with the vehicles of this invention including the alkyds and various phenol-aldehyde resins, melamine-aldehydes, urea-aldehydes, and other such hard varnish resins. The varnishes of this invention are generally used as solutions in mineral spirits and/or xylene at a concentration of about 40% to 60% non-volatile materials.

Other modes of applying the principles of this invention may be employed, changes being made as regards the details herein disclosed, provided the elements set forth in any of the following claims, or the equivalent of such be employed.

I, therefore, particularly point out and distinctly claim as my invention:

1. A fast drying, mineral spirit resistant co-polymer produced by co-polymerizing a vinyl aromatic compound and a non-conjugated unsaturated oil which has been partially polymerized by blowing with a free oxygen-containing gas and which is selected from the group consisting of drying oils and semi-drying oils at a temperature of from about 225° F. to about 500° F. in the presence of from 0.02% to about 1% by weight of the oil of a heavy metal drier soluble in the oil and from 0.5% to about 2.0% by weight of the oil of a metal-free peroxide, in which co-polymer the ratio of vinyl aromatic compound to oil is in the range of from 60:40 to 25:75.

2. A composition in accordance with claim 1 in which the vinyl aromatic compound is a styryl compound.

3. A composition in accordance with claim 1 in which the vinyl aromatic compound is styrene.

4. A composition in accordance with claim 1 in which the vinyl aromatic compound is alpha-methyl styrene.

5. A composition in accordance with claim 1 in which the vinyl aromatic compound is divinyl benzene.

6. A composition in accordance with claim 1 in which the oil is an air blown drying oil having a viscosity between E and $Z_4$, Gardner-Holdt.

7. A composition in accordance with claim 1 in which the drying oil is blown soya bean oil having a viscosity of from Z to $Z_4$.

8. A composition in accordance with claim 1 in which the drying oil is a blown linseed oil having a viscosity of from E to $Z_4$.

9. A composition in accordance with claim 1 in which the drying oil is a blown fish oil having a viscosity of about W.

10. A composition in accordance with claim 1 in which the temperature of reaction is from 275° F. to 325° F.

11. A composition in accordance with claim 1 in which the drier is a heavy metal salt of an acid selected from the group consisting of seed oil fatty acids, fish oil fatty acids, naphthenic acids, rosin acids and octoic acids.

12. A composition in accordance with claim 1 in which the drier is a mixture of different heavy metal salts of an acid selected from the group consisting of seed oil fatty acids, fish oil fatty acids, naphthenic acids, rosin acids and octoic acids.

13. A composition in accordance with claim 1 wherein the drier metal is selected from the group consisting of lead, zinc, cobalt, manganese, iron, copper and nickel and the acidic radical is an organic acid containing from 6 to 24 carbon atoms in the molecule.

14. A composition in accordance with claim 1 in which the drier is a cobalt salt of an organic acid containing from 6 to 24 carbon atoms in the molecule.

15. A composition in accordance with claim 1 in which the drier is a lead salt of an organic acid containing from 6 to 24 carbon atoms in the molecule.

16. A composition in accordance with claim 1 in which the drier is a manganese salt of an organic acid containing from 6 to 24 carbon atoms in the molecule.

17. A composition in accordance with claim 1 in which the metal-free peroxide is hydrogen peroxide.

18. A composition in accordance with claim 1 in which the metal-free peroxide is an aromatic peroxide.

19. A composition in accordance with claim 1 in which the metal-free peroxide is cumene-hydroperoxide.

20. A composition in accordance with claim 1 in which the metal-free peroxide is benzoyl peroxide.

21. A composition in accordance with claim 1 in which the metal-free peroxide is ditertiary butyl peroxide.

22. A composition in accordance with claim 1 in which the vinyl aromatic compound is styrene, the drying oil is a blown soya bean oil having a viscosity of from Z to $Z_4$, the drier is cobalt naphthenate, and the peroxide is hydrogen peroxide.

23. A composition in accordance with claim 1 in which the vinyl aromatic compound is alpha-methyl styrene, the drying oil is a blown linseed oil having a viscosity from E to $Z_4$, the drier is manganese naphthenate, and the peroxide is cumene hydroperoxide.

24. A composition in accordance with claim 1 in which the vinyl aromatic compound is divinyl benzene, the drying oil is a blown fish oil having a viscosity of about W, the drier is a mixed cobalt-lead naphthenate, and the peroxide is benzoyl peroxide.

25. A composition in accordance with claim 1 in which the vinyl aromatic compound is styrene, the drying oil is a blown linseed oil having a viscosity of from E to $Z_4$, the drier is a mixed cobalt-zinc salt of naphthenic acid, and the peroxide is ditertiary butyl peroxide.

26. The method of producing a fast drying, mineral spirit resistant co-polymer including the step of co-polymerizing at a temperature of about 300° F. a vinyl aromatic compound and a non-conjugated unsaturated oil which has been partially polymerized by blowing with a free oxygen-containing gas and which is selected from the group consisting of drying oils and semi-drying oils, in the presence of from 0.02% to about 1% by weight of the oil of a heavy metal drier soluble in the oil, and from 0.5% to about 2% by weight of the oil of a metal-free peroxide, the ratio of vinyl aromatic compound to oil being in the range of from 60:40 to 25:75.

27. The method of producing a fast drying, mineral spirit resistant co-polymer including the steps of co-polymerizing at a temperature of from about 225° F. to about 500° F., a vinyl aromatic compound and a non-conjugated unsaturated oil which has been partially polymerized by blowing with a free oxygen-containing gas and which is selected from the group consisting of semi-drying oils and drying oils, in the presence of from about 0.02% to about 1% by weight of the oil of a heavy metal drier soluble in the oil, and from 0.5% to about 2% by weight of the oil of a metal-free peroxide, the ratio of vinyl aromatic compound to oil being in the range of from 60:40 to 25:75.

28. The method of producing a fast drying, mineral resistant co-polymer including the steps of co-polymerizing at a temperature of from about 275° F. to 325° F., a styryl compound and a non-conjugated unsaturated oil which has been partially polymerized by blowing with a free oxygen-containing gas and which is selected from the group consisting of drying oils and semi-drying oils, in which oil has been dispersed from 0.02% to about 1% by weight of the oil of a heavy metal drier soluble in the oil, and adding slowly to the co-polymerization mass periodically during the reaction from 0.5% to about 2% by weight of the oil of a metal-free peroxide, the ratio of styryl compound to oil being in the range of from 60:40 to 25:75.

29. The method of producing a fast drying mineral resistant co-polymer including the steps of co-polymerizing at a temperature of about 300° F., styrene and linseed oil which has been partially polymerized by blowing with a free oxygen-containing gas and in which oil has been dispersed from 0.02% to about 1% by weight of the oil of a heavy metal naphthenate, and adding in dropwise manner at spaced intervals a metal-free peroxide until from 0.5% to about 2% by weight of the oil of such peroxide has been added, the ratio of styrene to oil being in the range of from 60:40 to 25:75.

30. The method of producing a fast drying, mineral spirit resistant co-polymer including the steps of co-polymerizing at a temperature of about 300° F., styrene and soya bean oil which has been partially polymerized by blowing with a free oxygen-containing gas and in which oil has been dispersed from 0.02% to about 1% by weight of the oil of a heavy metal naphthenate, and adding in dropwise manner at spaced intervals a metal-free peroxide until from 0.5% to about 2% by weight of the oil of such peroxide has been added, the ratio of styrene to oil being in the range of from 60:40 to 25:75.

31. The method of producing a fast drying, mineral spirit resistant co-polymer including the steps of co-polymerizing at a temperature of about 300° F., styrene and fish oil which has been partially polymerized by blowing with a free oxygen-containing gas and in which oil has been dispersed from 0.02% to about 1% by weight of the oil of a heavy metal naphthenate, and adding in dropwise manner at spaced intervals a metal-free peroxide until from 0.5% to about 2% by weight of the oil of such peroxide has been added, the ratio of styrene to oil being in the range of from 60:40 to 25:75.

32. The method of producing a fast drying, mineral spirit resistant co-polymer vehicle consisting essentially of the steps of heating to about 300° F. a solution of about equal amounts of a non-conjugated unsaturated oil which has been partially polymerized by blowing with a free oxygen-containing gas and which is selected from the group consisting of drying oils and semi-drying oils, said partially polymerized oils having a viscosity of from E to $Z_4$, and styrene, in a suitable amount of an inert solvent, said solution containing from 0.02% to about 1% by weight of the oil of a drier, and adding dropwise in substantially equal proportions at about 30 minute intervals from 0.5% to about 2% by weight of the drying oil of a metal-free peroxide, cooking to a cure of not less than about 9 seconds and thinning to about 50% non-volatile material.

33. A method in accordance with claim 32 in which the partially polymerized oil is linseed oil, the drier is cobalt naphthenate and the peroxide is hydrogen peroxide as a 30% solution.

34. A method in accordance with claim 32 in which the partially polymerized oil is soya bean oil having a viscosity of from Z to $Z_4$, the drier is cobalt naphthenate, and the peroxide is hydrogen peroxide as a 30% solution.

JAMES H. SAMPLE.

References Cited in the file of this patent

UNITED STATES PATENTS

| Number | Name | Date |
| --- | --- | --- |
| 2,485,592 | Griess et al. | Oct. 25, 1949 |
| 2,521,675 | Hoogsteen | Sept. 12, 1950 |